US009087420B2

(12) United States Patent
Amirpour et al.

(10) Patent No.: US 9,087,420 B2
(45) Date of Patent: Jul. 21, 2015

(54) SYSTEM AND METHOD FOR IDENTIFYING, DIAGNOSING, MAINTAINING, AND REPAIRING A VEHICLE

(75) Inventors: Ramon Amirpour, Ebersbach (DE); Guenter Nobis, Nuertingen (DE); Roger Malmsheimer, Allmersbach Im Tal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 14 days.

(21) Appl. No.: 13/985,475

(22) PCT Filed: Jan. 9, 2012

(86) PCT No.: PCT/EP2012/050232
§ 371 (c)(1), (2), (4) Date: Nov. 4, 2013

(87) PCT Pub. No.: WO2012/110263
PCT Pub. Date: Aug. 23, 2012

(65) Prior Publication Data

US 2014/0052329 A1 Feb. 20, 2014

(30) Foreign Application Priority Data

Feb. 16, 2011 (DE) ........................ 10 2011 004 205

(51) Int. Cl.
*G01M 17/00* (2006.01)
*G07C 5/00* (2006.01)
*G07C 5/08* (2006.01)

(52) U.S. Cl.
CPC .............. *G07C 5/008* (2013.01); *G07C 5/0808* (2013.01); *G07C 2205/02* (2013.01)

(58) Field of Classification Search
CPC ...... G07C 5/008; G07C 5/085; G07C 5/0808; G07C 5/0858; G01R 31/007
USPC ........................................................... 701/29
See application file for complete search history.

(56) References Cited

U.S. PATENT DOCUMENTS 4,602,127 A 7/1986 Neely et al.
6,192,303 B1 2/2001 Takakura et al.
(Continued)

FOREIGN PATENT DOCUMENTS

CN 201247152 5/2009
CN 102158162 8/2011
(Continued)

OTHER PUBLICATIONS

International Search Report for PCT/EP2012/050232, dated Apr. 12, 2012.

*Primary Examiner* — Ian Jen
(74) *Attorney, Agent, or Firm* — Kenyon & Kenyon LLP

(57) ABSTRACT

A method for diagnosing and maintaining a vehicle at a repair shop includes connecting a first vehicle inspection device to a first work station and selecting a mobile VCI which is provided a detection software component situated on a central repair shop server and a central diagnostic device; connecting the VCI to the vehicle; establishing a communication between the VCI and the diagnostic device; storing vehicle identification data in the VCI via the diagnostic device; performing a first set of vehicle inspections using the first vehicle inspection device and/or the VCI; disconnecting the first vehicle inspection device from the vehicle; connecting a second vehicle inspection device to the vehicle; reading out the identification data from the VCI into the second vehicle inspection device at a second work station via the diagnostic device; and performing a second set of vehicle inspections using the second vehicle inspection device and/or the VCI.

14 Claims, 10 Drawing Sheets

(56) References Cited

U.S. PATENT DOCUMENTS

| | | | | |
|---|---|---|---|---|
| 2003/0009271 | A1* | 1/2003 | Akiyama | 701/33 |
| 2007/0050105 | A1* | 3/2007 | Chinnadurai et al. | 701/29 |
| 2007/0093947 | A1* | 4/2007 | Gould et al. | 701/29 |
| 2009/0271239 | A1* | 10/2009 | Underdal et al. | 705/8 |
| 2009/0276115 | A1* | 11/2009 | Chen | 701/32 |
| 2009/0306849 | A1* | 12/2009 | Blanz et al. | 701/33 |
| 2010/0324376 | A1* | 12/2010 | Chinnadurai et al. | 600/300 |
| 2013/0110344 | A1* | 5/2013 | Merg et al. | 701/31.4 |
| 2014/0277918 | A1* | 9/2014 | Kim | 701/31.5 |

FOREIGN PATENT DOCUMENTS

| | | | |
|---|---|---|---|
| DE | 4446512 | A1 | 6/1996 |
| DE | 19921846 | A1 | 11/2000 |
| GB | 2327788 | A | 2/1999 |
| JP | 10253502 | A | 9/1998 |

* cited by examiner

SYSTEM AND METHOD FOR IDENTIFYING, DIAGNOSING, MAINTAINING, AND REPAIRING A VEHICLE

FIELD OF THE INVENTION

The present invention relates to a system and a method for identifying, diagnosing, maintaining, and repairing a vehicle, in particular in a motor vehicle repair shop.

BACKGROUND

The publication DE 44 46 512 A1 discloses a device for carrying out a vehicle check using a mobile wireless part which relays diagnostic data from a vehicle to a repair shop.

The publication DE 199 21 846 A1 discloses a diagnostic test device having a portable inspection device for motor vehicles.

The technical development of motor vehicle inspection technology has resulted in a plurality of specific external inspection devices for different inspection fields and motor vehicle components. The vehicle inspection devices used for this purpose are highly specialized and adapted to the corresponding vehicle components. Vehicle inspection devices are frequently used at special work stations in a repair shop or an inspection site, for example, since the vehicle inspection devices are installed fixedly in the repair shop. A vehicle which is present in the repair shop for error diagnosis and/or repair is moved from work station to work station, depending on the inspection or repair to be performed.

In today's motor vehicles, many functions are carried out by electronic control units which are connected to the vehicle electronics system. The electronic control units often also take over the on board diagnostic functions of the vehicle systems and store special diagnostic and/or operating mode data. To be able to evaluate the data of the diagnostic functions from the control units, universal diagnostic testers have been developed which enable a communication with the control units present in the vehicle. The functionality of the communication may vary greatly and relates, for example, to reading out stored error codes, relaying actual values, carrying out complex actuator tests, resetting service intervals, breaking in installed replacement parts, and similar tasks.

Diagnostic testers usually include in this case an assembly which is responsible for the communication with the vehicle. Most of the time, this assembly is used as a vehicle communication interface (VCI). VCIs of this type may also be situated in their own housing and communicate with universal input and display devices, such as laptops, PDAs, or smart phones, via wired or wireless transmission. The diagnostic functionality of universal diagnostic testers or input and display devices is in this case ensured via a corresponding diagnostic software which enables the operation, the display, the diagnosis sequence control, and the communication with the electronic control units via the VCI.

The specialization of the vehicle inspection devices currently usually requires the combination of individual inspection and repair steps with communication steps and the evaluation of the data in the electronic control units.

Two basic approaches, which are schematically shown in FIGS. 6 and 7, have been established so far in the design of the inspection devices and repair shop visits.

FIG. 6 shows a vehicle 61 in a repair shop. Vehicle 61 includes here one or multiple electronic control units 62 which are installed in vehicle 61. During an inspection or repair sequence in a repair shop, vehicle 61 is moved to different work stations 65*a*, 65*b*, and 65*c* which may be spatially separated from one another. At each of work stations 65*a*, 65*b*, 65*c*, a specific vehicle inspection device 64*a*, 64*b*, 64*c* is present which is assigned to the particular work station. Specific vehicle inspection devices 64*a*, 64*b*, 64*c* may be connected for inspection purposes to the components of vehicle 61, e.g., the exhaust, the engine, the air conditioner, or other components. At each work station, a universal diagnostic tester 63 associated with particular work station 65*a*, 65*b*, 65*c* is additionally provided, using which the communication with electronic control units 62 of vehicle 61 is established via a not illustrated standardized vehicle interface. Alternatively, the repair shop has only one universal diagnostic tester 63 which is moved from work station to work station as needed.

During a repair shop visit of vehicle 61, it is necessary that particular universal diagnostic tester 63 of each work station 65*a*, 65*b*, 65*c* is connected to the not illustrated standardized vehicle interface. The operation of diagnostic tester 63 and of particular vehicle inspection device 64*a*, 64*b*, 64*c* takes place separately. This may lead to manual input errors by the users of the devices. Moreover, a certain amount of additional time and effort is required for the repeated identification of vehicle 61 at each of work stations 65*a*, 65*b*, 65*c* by diagnostic tester 63.

FIG. 7 shows a different approach, as follows. A vehicle 71 including one or multiple installed electronic control units 72 passes through work stations 75*a*, 75*b*, 75*c* in a repair shop. There is a specific vehicle inspection device 74*a*, 74*b*, 74*c* at each of work stations 75*a*, 75*b*, 75*c*. Each of specific vehicle inspection devices 74*a*, 74*b*, 74*c* includes an integrated VCI 73*a*, 73*b*, 73*c*, with the aid of which a communication is established with electronic control units 72 in vehicle 71 via a not illustrated standardized vehicle interface. For this reason, the operation of a separate universal diagnostic tester in parallel to the vehicle inspection device, as in FIG. 6, is dispensed with. Furthermore, a separate identification of vehicle 71 is, however, necessary at different work stations 75*a*, 75*b*, 75*c* by particular integrated VCI 73*a*, 73*b*, 73*c*. Moreover, particular vehicle inspection devices 74*a*, 74*b*, 74*c*, in particular their inspection device software, must be adapted to integrated VCIs 73*a*, 73*b*, 73*c*. At a work station without a specific vehicle inspection device, a universal diagnostic tester including an integrated VCI may then be used.

SUMMARY

The present invention provides for carrying out the identification of a vehicle, which identification is used for a plurality of work steps in a repair shop or inspection site, only once at the beginning of the repair shop visit or the inspection site visit. According to example embodiments, as soon as the vehicle has been identified once with the aid of identification data, the identification data are stored in the VCI installed in the vehicle and are moved along with the vehicle from work station to work station. For this purpose, the VCI remains in the particular vehicle until the end of the repair shop visit. The multiple VCIs in a repair shop may then be managed and controlled centrally via a repair shop network from a central diagnostic server device.

During the repair shop visit, vehicle inspection devices and/or universal input and display devices present at the particular work stations may initiate a communication with the VCI and the control units of the vehicle present at the work station via the central diagnostic server device, retrieve the identification data of the vehicle, and, for example, exchange the diagnostic information with the vehicle control units. This saves the particular user of the vehicle inspection device and/or of the universal input and display device from installing and uninstalling the VCI as well as the time needed for a complex identification of the vehicle and for establishing communication with the control units installed in the vehicle. In this way, the vehicle inspection and/or the error diagnosis may be started faster, on the one hand, and, on the other hand, errors, which would otherwise occur during the manual vehicle detection, are avoided.

A method according to an example embodiment of the present invention for identifying, diagnosing, maintaining, and repairing a vehicle in a repair shop includes the steps of connecting a mobile communication interface (VCI) and a first vehicle inspection device to the vehicle at a first work station, establishing a communication connection between the VCI and a central diagnostic server device situated on a central repair shop server as well as the first vehicle inspection device, identifying the vehicle for diagnostic purposes, in particular for the control unit communication, storing the identification data for the vehicle in the VCI, diagnosing, maintaining, or repairing the vehicle simultaneously using the first vehicle inspection device and the VCI via the central diagnostic server device, disconnecting the first vehicle inspection device from the vehicle, and connecting a second vehicle inspection device to the vehicle at a second work station, reading out the identification data from the VCI into the second vehicle inspection device, and diagnosing, maintaining, or repairing the vehicle simultaneously using the second vehicle inspection device and the VCI via the central diagnostic server device.

The communication connection between the VCI and the central diagnostic server device is advantageously a wireless communication connection. Therefore, the VCI may be flexibly moved along with the vehicle in the repair shop.

Preferably, the method according to an example embodiment of the present invention, furthermore includes the steps of ascertaining identification and/or diagnostic data in the central diagnostic server device of vehicles present in the repair shop and provided with VCIs, of transmitting the ascertained identification and/or diagnostic data to the first or the second vehicle inspection device, and of displaying and processing, at the first and the second work stations, the ascertained identification and/or diagnostic data for the user of the particular first or second vehicle inspection device. Here, the display of identification and/or diagnostic data at the particular first or second work station takes place as a function of the proximity of the particular vehicle or the connected VCI to the work station. This makes it advantageously possible to track the VCI and thus the connected vehicle during the repair shop visit.

According to another example embodiment of the present invention, a system for identifying, diagnosing, maintaining, and repairing a vehicle in a repair shop is provided, which system includes (a) a central diagnostic server device, (b) a plurality of VCIs, each including a connection device which is configured to connect a VCI to a standardized vehicle interface of a vehicle in a repair shop, a memory device which is configured to additionally store identification data of the vehicle to be identified and connected, and a communication device which is configured to transfer identification and diagnostic data of the connected vehicle to the central diagnostic server device, and (c) a plurality of vehicle inspection devices, each including different vehicle inspection modules, a communication device for establishing a communication with the central diagnostic server device, an input and display unit of the vehicle inspection device for controlling the vehicle inspection modules and the VCIs, the plurality of vehicle inspection devices being configured to retrieve identification and, for example, diagnostic data of a vehicle from one of the plurality of VCIs via the central diagnostic server device and to carry out inspection-device specific vehicle inspections in the vehicle based on the retrieved identification and diagnostic data and the diagnostic results of the specific vehicle inspection modules.

The system according to an example embodiment of the present invention includes, advantageously, a central diagnostic server device which is situated at a central repair shop server.

According to an example embodiment, the system advantageously includes a group of the plurality of vehicle inspection devices, which include local diagnostic server devices configured to establish a communication with the plurality of VCIs.

The various example embodiments and/or example features described herein may be combined in various combinations, including combinations not specifically mentioned.

Further features and advantages of specific example embodiments of the present invention are described with respect to the following description with reference to the appended drawings, in which elements, features, and components which are identical or include or provide identical functions are each identified with identical reference numerals, unless otherwise indicated. It is understood that the components and elements in the drawings are not necessarily true to scale to one another for the sake of clarity and comprehensibility.

DETAILED DESCRIPTION

The vehicle inspection devices of the present application are not limited to specific types of inspections. They may, for example, include axle measurement testers, engine testers, emission testers, brake testers, shock absorber testers, track testers, weighing devices, brake fluid testers, sound level meters, diesel exhaust gas testers, chassis measuring devices, toe angle measuring devices, steering angle testers, air conditioner testers, and the like. These vehicle inspection devices may be used in repair shops, in particular motor vehicle repair shops, inspection sites, and/or similar facilities. In particular, the methods and devices according to the present invention are, according to example embodiments, likewise usable in these facilities.

Communication interfaces for vehicles are described herein and are referred to herein as vehicle communication interfaces, in short VCI. According to example embodiments of the present invention, these communication interfaces are mobile interfaces which are movable along with the vehicle in a repair shop from work station to work station.

Figure 8:
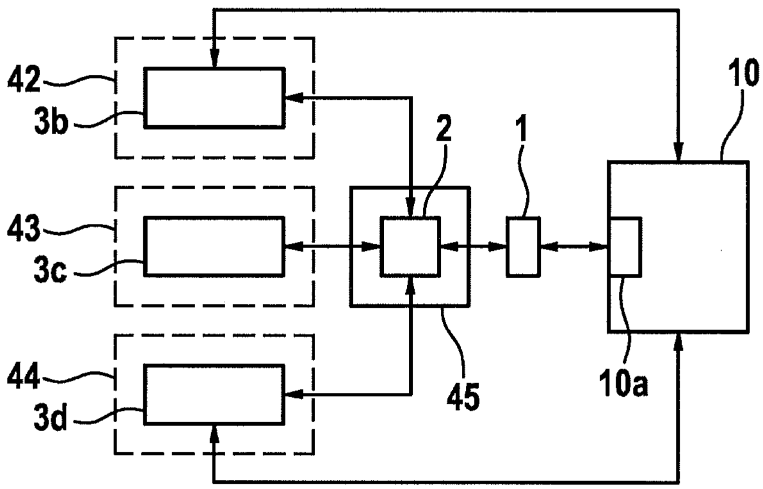
FIG. 8 shows a schematic representation of a vehicle inspection device set-up in a repair shop according to an example embodiment of the present invention.

FIG. 8 shows a schematic representation of a vehicle inspection device set-up in a repair shop according to an example embodiment of the present invention.

In FIG. 8, a vehicle 10, in particular a motor vehicle, includes one or multiple electronic control units 10*a*. Electronic control unit(s) 10*a* can include specific control units for specific vehicle components or a universal electronic control unit 10*a* of vehicle 10. Electronic control units 10*a* may obtain available diagnostic data, error data, actual values, operating mode data, or similar vehicle-relevant data for specific vehicle components via a standardized vehicle interface (not illustrated) and may be transferred into certain operating modes or sequences.

Electronic control unit(s) 10*a* is/are connected to a VCI 1 via a standardized vehicle interface (not illustrated). VCI 1 is connectable to vehicle 10 at the beginning of a repair shop visit, e.g., at the vehicle drop-off point. According to an example embodiment, VCI 1 is configured to store unique identification data of vehicle 10, e.g., the vehicle owner, the license plate number, the vehicle make, the vehicle manufacturer, the chassis number, or similar identification data. According to an example embodiment, the unique identification data can in this case be re-entered at the vehicle drop-off point of the repair shop with the aid of a universal input and display unit or retrieved from a previous repair shop visit from a central repair shop data base.

According to an example embodiment, the identification data is storable in VCI 1 via a central repair shop server 45. According to an example embodiment, central repair shop server 45 in this case includes a central diagnostic server device 2 which is responsible for establishing communication connections to VCI 1. According to an example embodiment, central diagnostic server device 2 in this case is configured to communicate with VCI 1 via a wireless or wired communication connection, for example. In particular, it is possible via central diagnostic device 2 to manage and communicate with a plurality of VCIs 1, which are used in the repair shop and which are connected to different vehicles 10.

VCI 1 is configured to be moved along with vehicle 10 in the repair shop when vehicle 10 is moved through work stations 42, 43, 44. The specific vehicle inspection devices or universal input and display units 3*b*, 3*c*, 3*d* are present at work stations 42, 43, 44. In this case, specific vehicle inspection devices or universal input and display units 3*b*, 3*c*, 3*d* may be connected at every work station to the particular vehicle components of vehicle 10 to carry out the diagnosis and/or repair work of vehicle 10.

Central diagnostic server device 2 forms the communication contact point for specific vehicle inspection device 3*b*, 3*c*, 3*d*, i.e., central diagnostic server device 2 is configured to establish a communication connection with VCI 1 on the one hand and a communication connection with each of specific vehicle inspection devices 3*b*, 3*c*, 3*d* on the other hand. The identification data of vehicle 10 and, for example, the diagnosis of electronic control units 10*a* are then, according to an example embodiment, transferable from VCI 1 to specific vehicle inspection devices 3*b*, 3*c*, 3*d* via central diagnostic server device 2. The communication connection between central diagnostic server device 2 and specific vehicle inspection devices 3*b*, 3*c*, 3*d* can be wireless or wired.

Figure 1:
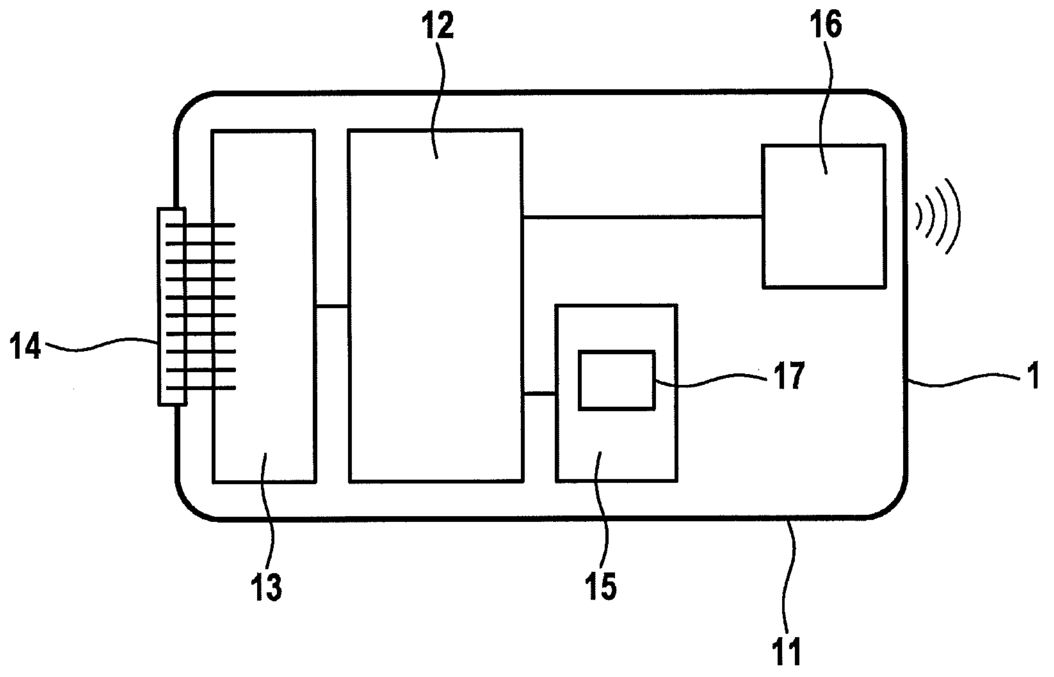
FIG. 1 shows a schematic representation of a VCI according to an example embodiment of the present invention.

FIG. 1 shows a schematic representation of VCI 1, according to an example embodiment of the present invention. According to the example embodiment of FIG. 1, VCI 1 is situated in a housing 11 and includes a microprocessor 12, a connecting device 13 including a plug connector 14 for connecting VCI 1 to a standardized vehicle interface in a vehicle, a memory device 15 for storing unambiguous identification data of the vehicle to be connected, and a communication device 16 for establishing a communication connection with a central diagnostic server device 2.

Microprocessor 12 is configured to evaluate control instructions for VCI 1 and to control connecting device 13, memory device 15, and communication device 16. Microprocessor 12 may include, for example, a microcontroller, an ASIC, or a similar device.

Connecting device 13 may be configured to provide, at a lower communication layer, in particular a bit transmission layer ("physical layer"), interfaces for connection of diagnostic bus systems of the vehicle. Electronic control units of the vehicle are addressable via the diagnostic bus systems according to an example embodiment.

Memory device 15 may include a relatively large memory volume in comparison to conventional VCIs in order to provide an appropriate amount of memory space for the unambiguous identification data of the vehicle and to store the configuration data of microprocessor 12, connecting device 13, and communication device 16. Memory device 15 includes corresponding software 17 which is specific for the operation of VCI 1. Software 17 is described in greater detail below with respect to FIG. 2.

Communication device 16 is configured to establish a communication connection with a central diagnostic server device 2, e.g., in a central repair shop server. For this purpose, communication device 16 includes, according to an example embodiment, an arrangement for establishing a wired or wireless connection, e.g., a wireless module for Bluetooth or WLAN, an infrared interface, an RFID transponder, or the like.

VCI 1 does not include any input or display elements in the present example. The input and display elements may, for example, be provided via a universal input and display unit to be connected to VCI 1 or via a vehicle inspection device. According to an alternative example embodiment, VCI 1 is equipped with its own input and display elements. According to another alternative example embodiment, VCI 1 is controlled by and/or provides an output to an input and display element of a central repair shop server which includes a central diagnostic server device 2.

Figure 2:
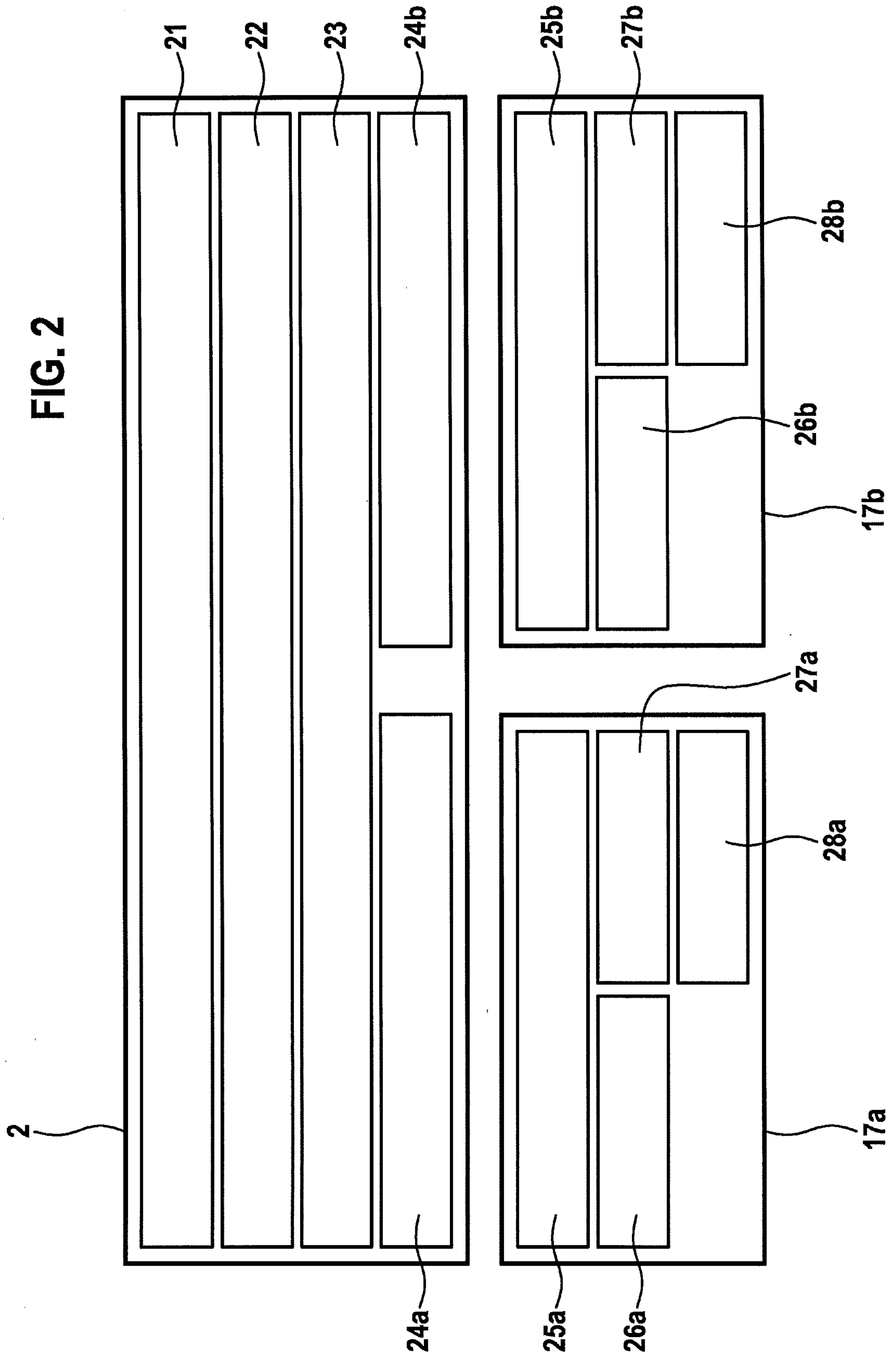
FIG. 2 shows a schematic representation of software architecture of two VCIs and of a central diagnostic server device according to an example embodiment of the present invention.

FIG. 2 shows a schematic representation of the software architecture of two VCIs, for example like VCI 1, and of a diagnostic server device 2, according to another example embodiment of the present invention.

Shown software parts 17*a* and 17*b* may correspond to software 17 which may be stored in a memory device 15 of VCI 1 from FIG. 1. Software parts 17*a* and 17*b* each includes a first communication layer 25*a*, 25*b*, a memory software 26*a*, 26*b*, a protocol software 27*a*, 27*b*, and a second communication layer 28*a* and 28*b*. Individual software components 25*a/b*, 26*a/b*, 27*a/b*, and 28*a/b* may be combined in one software code. It is also possible for software parts 17*a* and 17*b* to each include additional software components.

First communication layer 25*a*, 25*b* is configured to establish a communication with a communication layer 24 of a central diagnostic server device 2 and to control the VCI. Communication layer 24 of central diagnostic server device 2 may include two components 24*a* and 24*b* which are each provided for the communication with one of the two mobile communication interfaces. Memory software 26*a*, 26*b* is configured to receive, store, and manage the identification data for vehicle 10. According to an example embodiment, the identification data is kept for the duration of a repair shop stay of vehicle 10 and, if necessary, output via central diagnostic server device 2 to the specific vehicle inspection devices or universal input and display units.

Protocol software 27*a*, 27*b* is configured to provide the necessary protocols for the communication with vehicle 10 and/or central diagnostic server device 2. Second communication layer 28*a*, 28*b* is configured to control the communication connections established with the control units in vehicle 10 via connecting device 13 in FIG. 1.

Central diagnostic server device 2 includes as software components a communication layer 21, a software interface 22, a diagnostic server software 23, and a second communication layer 24.

Diagnostic software 23 may be configured in conjunction with software interface 22 to manage and access multiple mobile communication interfaces 1 at the same time.

Second communication layer 24*a*, 24*b* is usable for communicating with first communication layer 25*a*, 25*b* of software 17*a* or 17*b* of the VCIs. According to an example embodiment, second communication layer 24*a*, 24*b* of central diagnostic server device 2 is configured to register which VCIs 1 are located in the range of certain vehicle inspection devices. This information can change dynamically with the movement of a plurality of vehicles provided with VCI 1 within a repair shop. In particular, according to an example embodiment, VCIs 1 are configured via communication devices 16 to display their presence via beacon signals to central diagnostic server device 2 of a central repair shop server in a repair shop.

First communication layer 21 of central diagnostic server device 2 may be configured to provide an interface for specific vehicle inspection devices. First communication layer 21 may be configured to provide functions of the control unit communication. This includes, for example, reading out errors, actual values, and/or operating mode data; deleting and overwriting values in control units, e.g., of service intervals, and/or error registers; actuator activations; and/or carrying out complex inspection sequences such as a steering angle calibration, an ABS sensor inspection, a pump inspection, a brake circuit bleeding, and the like. First communication layer 21 is furthermore configured to relay unambiguous vehicle identifications from the electronic control units of vehicle 10, to be connected, to the specific vehicle inspection devices and the VCI. First communication layer 21 may in this case be adapted to the specific vehicle inspection device, e.g., using a preconfigured inspection device parameter set which may be retrieved from the vehicle inspection device.

Figure 3:
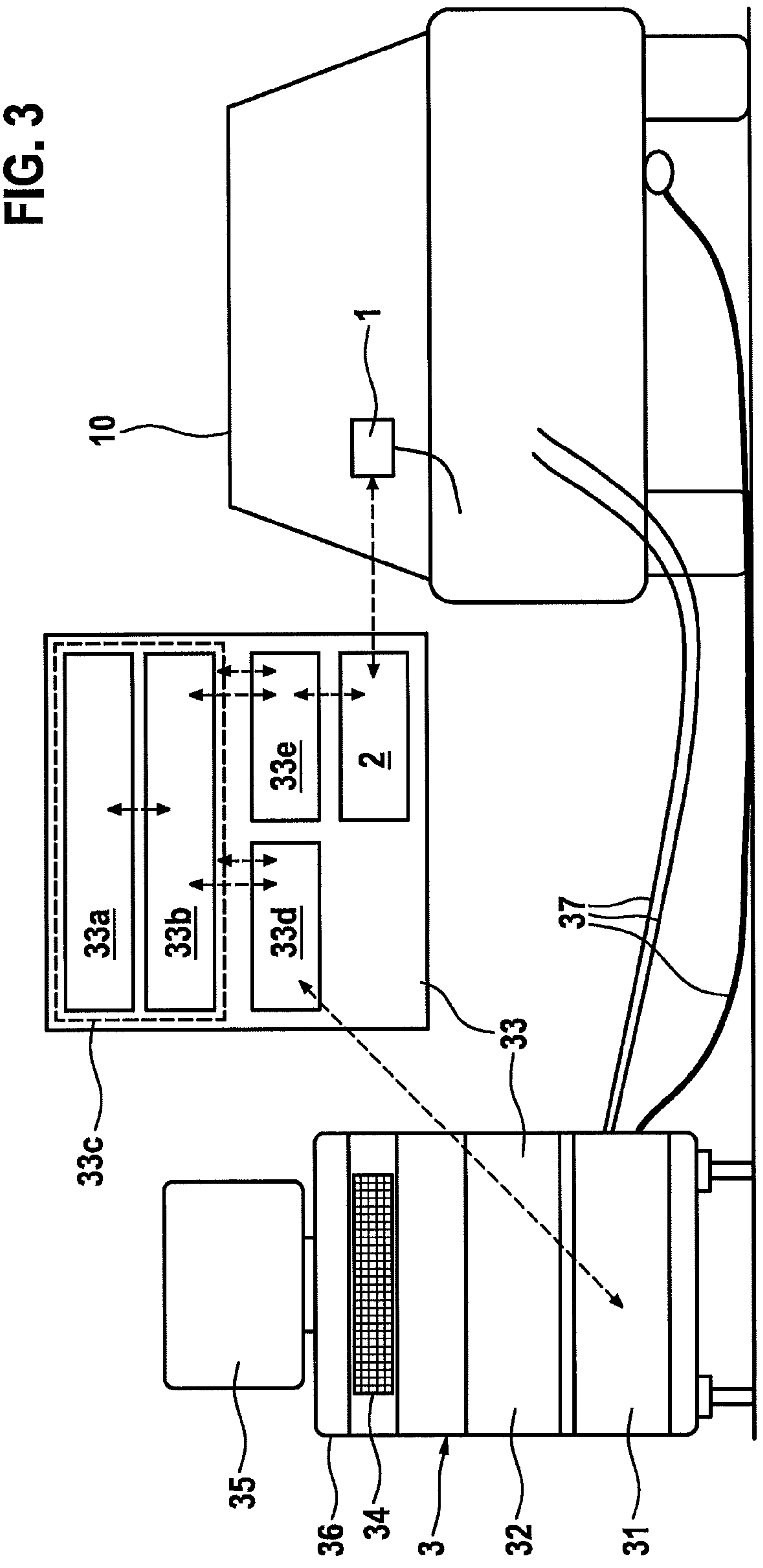
FIG. 3 shows a schematic representation of a set-up of a repair shop work station according to an example embodiment of the present invention.

FIG. 3 shows a schematic representation of the set-up of a repair shop work station according to an example embodiment of the present invention.

A vehicle 10 is shown to which a VCI 1 according to FIG. 1 is connected. Vehicle 10 is located at a work station in a repair shop or inspection site at which a corresponding vehicle inspection device 3 is present. Vehicle inspection device 3 includes an inspection module 31, a control computer 32 including control software 33, an input device 34, and a display device 35. Vehicle inspection device 3 may be connected to vehicle 10 or to the vehicle components of vehicle 10, such as the exhaust, the engine, the air conditioner, the braking system, or the like, via cables, sensors, hoses, and similar suitable connecting arrangements 37. Vehicle inspection device 3 may be situated in a housing 36. Vehicle inspection device 3 may be accommodated in a trolley, for example, or fixedly connected to the repair shop floor at the work station.

Inspection module 31 may include a specific vehicle inspection module which may carry out predefined inspections or a diagnosis with regard to certain vehicle components of vehicle 10, e.g., engine tests, chassis measurement, air conditioning service, or the like. Control computer 32 may be configured to control the corresponding specific functions of inspection module 31 with the aid of control software 33.

Control software 33 is shown in the offset box in FIG. 3 in larger detail. Control software 33 includes a software layer 33*a* for operating vehicle inspection device 3 as well as for visualizing the inspection sequences and results, a software layer 33*b* for controlling the inspection sequences, a first communication layer 33*d*, which establishes a communication between the inspection sequence control through software layer 33*b* and inspection module 31, a second communication layer 33*e*, which establishes a communication between the inspection sequence control through software layer 33*b* and a diagnostic server device 2*a*, as well as diagnostic server device 2 according to FIG. 2. Here, diagnostic server device 2*a* may be a local or decentralized diagnostic server device which may be in principle designed on a repair shop server 45 similarly to the described central diagnostic server device 2 and which enables a direct communication connection between a vehicle inspection device 3 and a VCI 1. For example, in the case of failure of a central diagnostic server device 2, decentralized diagnostic server device 2*a* of vehicle inspection device 3 in FIG. 3 may take over bridging communication tasks with VCI 1. Then, a wireless communication preferably takes place between decentralized diagnostic server device 2*a* in FIG. 3 and VCI 1.

Software layers 33*a* and 33*b* for operation, display, and inspection sequence control may also be integrated into a joint software layer 33*c*. Second communication layer 33*e* may include a software component for communicating with the user, a software component for establishing a communication with central or decentralized diagnostic server device 2*a*, a software component for the communication of the inspection sequence control with central or decentralized diagnostic server device 2*a* during an inspection sequence, and an inspection device parameter set.

Communication layer 33*e* may be configured to display a list of vehicles 10, whose VCI 1 is in the range of diagnostic server device 2 or the particular work station, to a user of vehicle inspection device 3 via display unit 35. In this way, the user may select the correct vehicle via input device 34 from the list of vehicles 10 in question. The list may in this case also be generated by the central diagnostic server device 2 on a repair shop server 45 and transmitted to the vehicle inspection device. Preferably, by selecting a vehicle 10 on a vehicle inspection device 3, corresponding VCI 1 may be blocked for selection at other work stations or together with other vehicle inspection devices. Thus, errors may be advantageously prevented during the vehicle selection process. It may, however, also be provided that a parallel access by multiple vehicle inspection devices and/or universal input and display devices is possible via the central diagnostic server device 2. In this way, it is, for example, possible that a vehicle inspection device for brake inspection accesses a VCI 1 of a vehicle 10 at the same time as a universal input and display device, e.g., a laptop, so that multiple inspection and/or maintenance and/or repair steps may be carried out in parallel.

According to an example embodiment, at the beginning of the actual inspection sequence in the previous work steps of the repair shop visit, communication layer 33*e* receives already stored identification data from VCI 1 of vehicle 10 and relays them to software layer 33*b* for inspection sequence control. In this way, the inspection sequence can advantageously be adapted automatically to vehicle 10. During the inspection sequence, communication layer 33*e* can also activate functions in the electronic control units of vehicle 10 via the central or decentralized diagnostic server device and dynamically relay diagnostic data from the electronic control units of vehicle 10 to software layer 33*b* during the inspection sequence.

Communication layer 33*e* can furthermore advantageously receive preconfigured parameters of specific inspection module 31 to activate or deactivate in a targeted manner certain functions of the electronic control units of vehicle 10. In this way, the functional scope of the electronic control units, which is usually large, may be reduced to the functions needed for the particular inspection sequence in order to avoid errors by the user during the operation of vehicle inspection device 3.

Figure 3A:
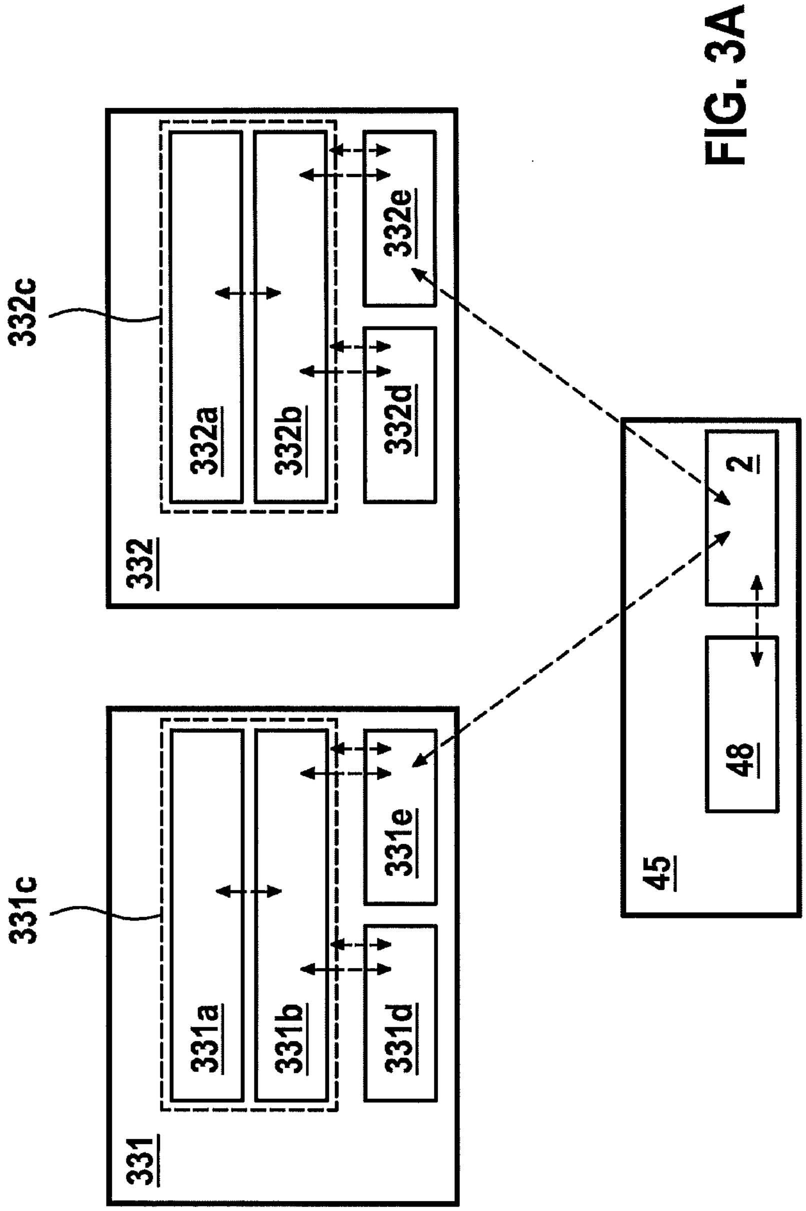
FIG. 3*a* shows a schematic representation of software architecture of control software of two vehicle inspection devices and a central diagnostic server device, and a detection software component in a central repair shop server, according to another example embodiment of the present invention.

FIG. 3*a* shows a schematic representation of the software architecture of the control software of two vehicle inspection devices and of a central diagnostic server device 2 according to another example embodiment of the present invention.

Particular control software 331 and 332, including, respectively, components 331*a*, 331*b*, 331*d*, and 331*e* and components 332*a*, 332*b*, 332*d*, and 332*e*, of the two vehicle inspection devices corresponds, for example, to control software 33 of vehicle inspection device 3 in FIG. 3. Here, the components of control software 331 and 332 each differs from control software 33 of vehicle inspection device 3 in FIG. 3 in that decentralized or local diagnostic server devices 2*a* are not provided.

Instead, diagnostic server device 2 in FIG. 3*a* is situated as central diagnostic server device 2 on a central repair shop server 45. Central repair shop server 45 furthermore includes, according to an example embodiment, a detection software component 48 which is configured to manage all VCIs 1, presently used in the repair shop or inspection site, and their connected vehicles 10. Furthermore, according to an example embodiment, detection software component 48 is configured to detect and store in VCI 1 unambiguous identification data of the vehicle such as owner, license plate number, chassis number, and the like.

It may additionally also be possible to equip one or multiple vehicle inspection devices in a repair shop, preferably an inspection device at the vehicle drop-off point, with detection software component 48. It may furthermore also be possible to provide a universal input and display unit, e.g., a laptop, a PDA, or a smart phone, with detection software component 48 instead of a vehicle inspection device 3.

Figure 4:
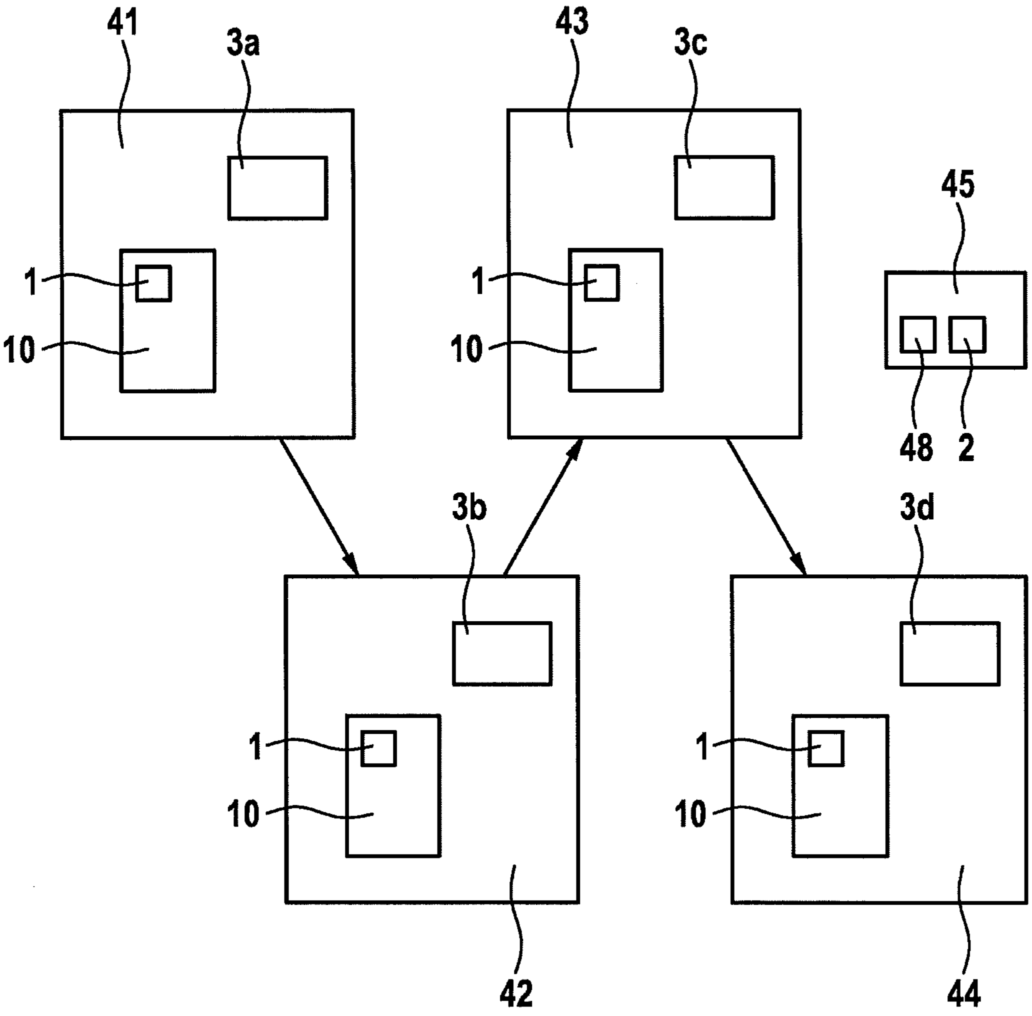
FIG. 4 shows a schematic representation of a method for identifying, diagnosing, maintaining, and repairing a vehicle in a repair shop via a VCI and a central repair shop server, according to an example embodiment of the present invention.
Figure 5:
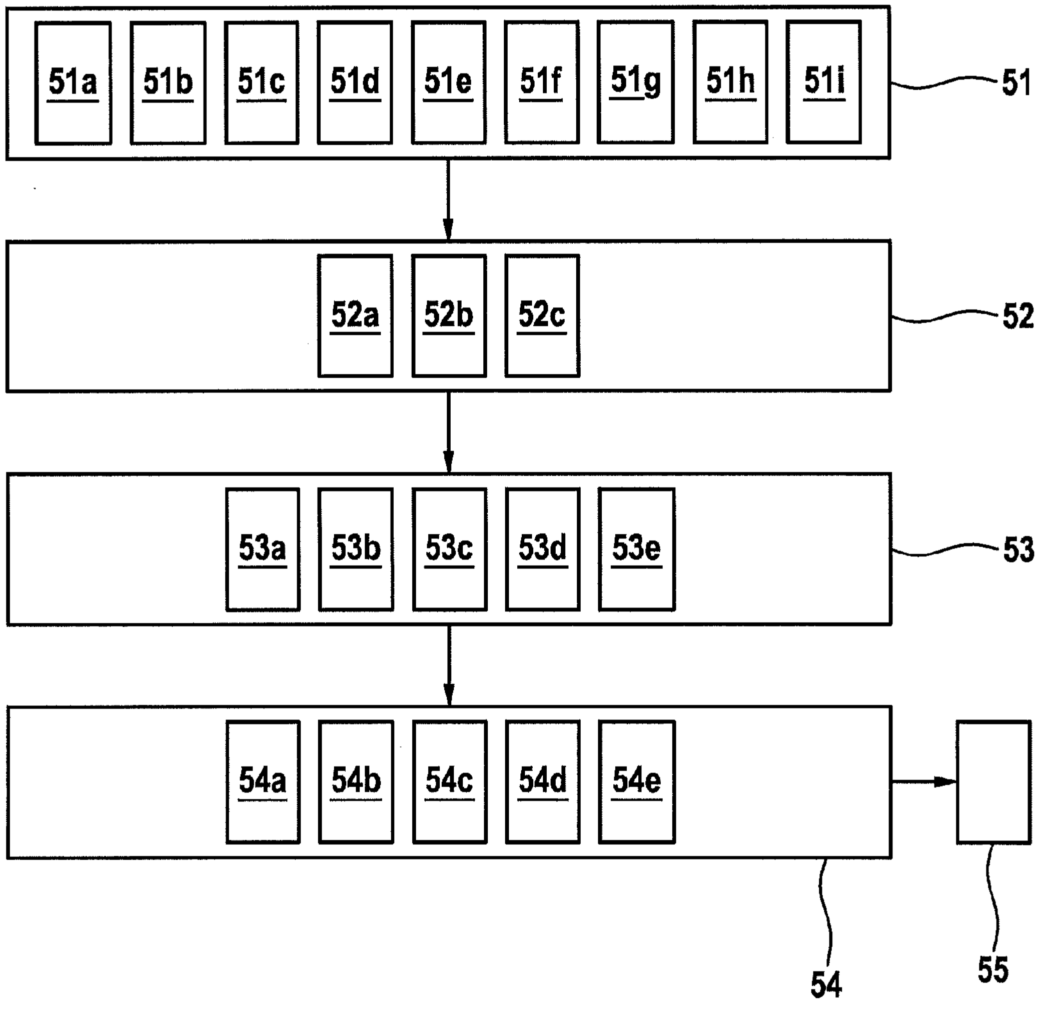
FIG. 5 shows a schematic representation of a method for identifying, diagnosing, maintaining, and repairing a vehicle in a repair shop via a VCI, according to an example embodiment of the present invention.
Figure 6:
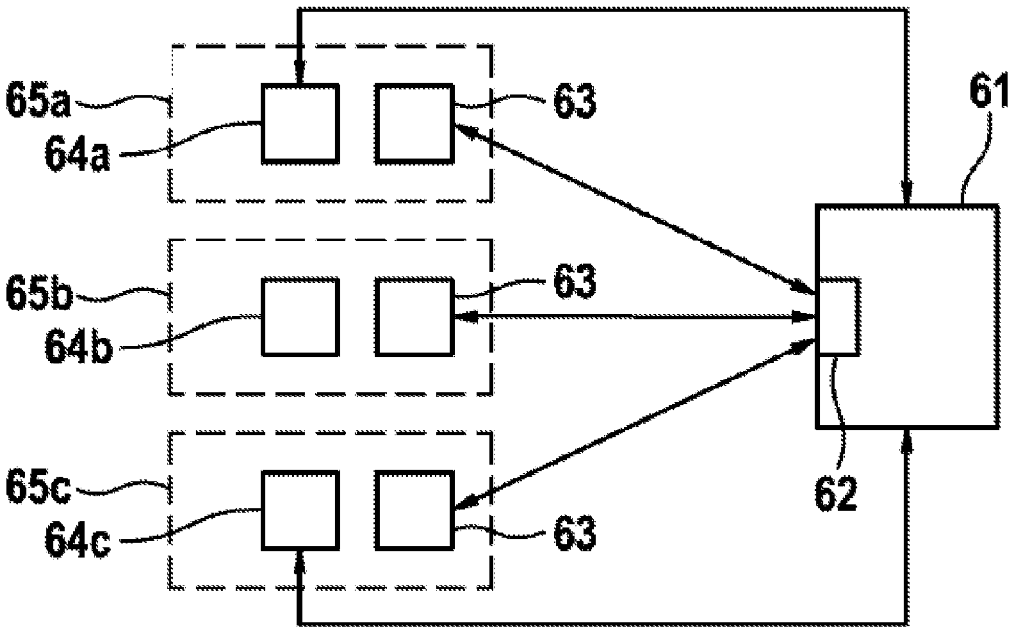
Figure 6 PRIOR ART
FIG. 6 shows a schematic representation of a conventional vehicle inspection device set-up in a repair shop.
Figure 7:
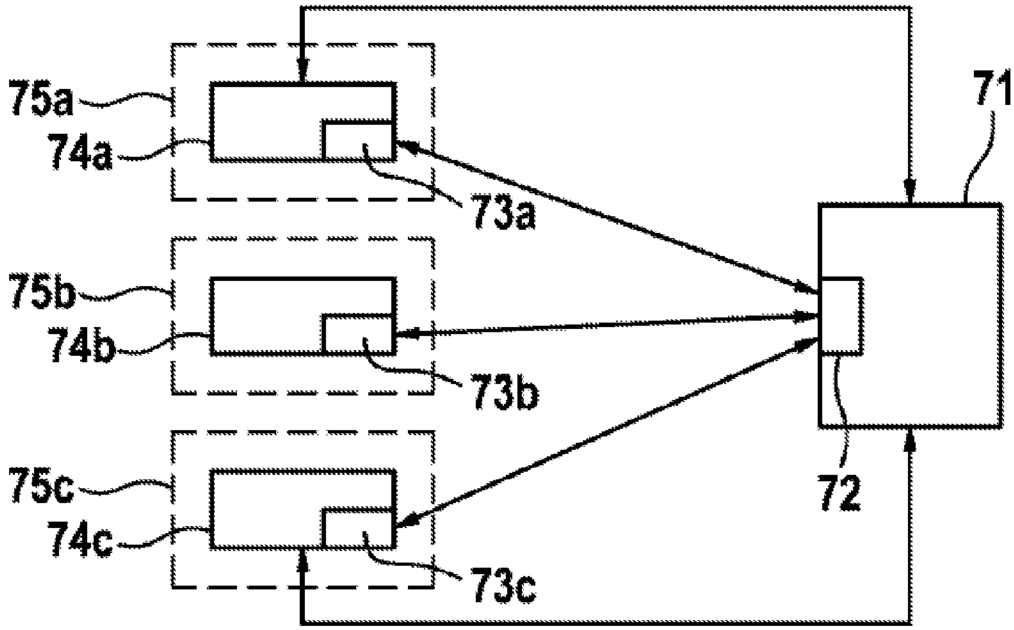
Figure 7 PRIOR ART
FIG. 7 shows a schematic representation of another conventional vehicle inspection device set-up in a repair shop.

FIG. 4 shows a schematic representation of a flow of a method for identifying, diagnosing (inspecting), maintaining, and repairing a vehicle 10 in a repair shop using a VCI 1 according to FIG. 1, according to an example embodiment of the present invention. The sequence of the method according to FIG. 4 is explained in greater detail with reference to the steps of the schematic representation, shown in FIG. 5, of a method for identifying, diagnosing, maintaining, and repairing a vehicle in a repair shop via a VCI 1 based on an exemplary repair shop visit according to another example embodiment of the present invention.

After entering the customer or vehicle data into the repair shop system (step 51*a*) and inquiring about the error symptoms from the customer (step 51*b*), it may be checked at a first work station 41, e.g., at the vehicle drop-off point of a repair shop, using a first vehicle inspection device 3*a* via a central repair shop server 45 including a central diagnostic server device 2 and a detection software component 48, how many of the total number of VCIs 1 are operational, which VCIs 1 are available for installation into a vehicle 10, which one of VCIs 1 is connected to which vehicle 10, and which one of vehicle inspection devices 3*a*, 3*b*, 3*c*, 3*d* is connected to which VCI 1 or vehicle 10. As a result of this check, one of operational VCIs 1, which are available for installation into a vehicle 10, is selected and connected (step 51*c*) to vehicle 10 to be maintained and repaired. First vehicle inspection device 3*a* may, for example, be a universal input and display unit which may be used in cooperation with VCI 1 for a rapid diagnostic test of vehicle 10.

First vehicle inspection device 3*a* may be used, on the one hand, to read out the vehicle and/or customer data already stored in the repair shop system for vehicle 10 via a central repair shop server 45 including a central diagnostic server device 2 and a detection software component 48 or, on the other hand, input by the user (step 51*d*); furthermore, unambiguous vehicle identification data may be ascertained (step 51*e*) and transferred, together with the vehicle and/or customer data, preferably wirelessly via central diagnostic server device 2, to VCI 1 by storing (step 51*f*) the vehicle identification data at least for the duration of the repair shop visit.

Furthermore, it is, for example, possible to carry out (step 51*g*) a rapid diagnostic test using VCI 1 at first work station 41, after the completion of which a result protocol is printed (step 51*h*), by detecting all error storage inputs in the electronic control units of vehicle 10. Subsequently, the repair shop order may be discussed with the customer (step 51*i*).

Then, vehicle 10 is moved to a second work station 42 within the repair shop. VCI 1 is not disconnected from vehicle 10 during this process and is moved along with vehicle 10. Second work station 42 may, for example, be a work station for diagnosing and troubleshooting (step 52). A second vehicle inspection device 3*b* or a universal input and display unit is present at second work station 42. Second vehicle inspection device 3*b* establishes a communication with VCI 1 via central diagnostic server device 2 and reads out automatically the stored vehicle identification data from VCI 1 via central diagnostic server device 2. For troubleshooting (step 52*a*), it may be provided that additional special vehicle-inspection or diagnosis steps for troubleshooting are carried out on vehicle 10 at second work station 42 using VCI 1 and vehicle inspection device 3*b* depending on the error symptoms (step 51*b*) indicated by the customer or on the results of the rapid diagnostic test (step 51*g*). For example, a defective steering angle sensor may be identified (step 52*b*) in the process and a result protocol is again prepared (step 52*c*) after the troubleshoot.

Subsequently, vehicle 10 is moved again together with VCI 1 to a third work station 43 including a third vehicle inspection device or a universal input and display unit 3*c*. Third work station 43 may in this case be a repair work station, for example. After procuring a replacement part (step 53*a*), a defective vehicle component, e.g., a defective steering angle sensor, may, for example, be uninstalled (step 53*b*) and replaced by a replacement part (step 53*c*) at a third work station. With the aid of central diagnostic server device 2, a communication with VCI 1 may be established via vehicle inspection device 3*c* and thus with one or multiple electronic control units in vehicle 10, so that the new steering angle sensor, for example, may be registered or broken in (step 53*d*) in the appropriate electronic control unit of vehicle 10. Subsequently, a result protocol is prepared again (step 53*e*).

After the repair, vehicle 10 is moved to a fourth work station 44 at which the vehicle geometry of vehicle 10 may be measured (step 54*a*) and the chassis may be set (step 54*b*), for example. For this purpose, a fourth vehicle inspection device 3*d*, e.g., an inspection device for chassis measurement, is provided at fourth work station 44. With the aid of the communication between fourth vehicle inspection device 3*d* and VCI 1 via central diagnostic server device 2, the newly installed steering angle sensor may be automatically calibrated (step 54*d*) by vehicle inspection device 3*d* after the completion of the chassis measurement and chassis setting, since the necessary identification data of vehicle 10 are already present in VCI 1. The identification data of vehicle 10 may also already be used for preparing the measurement and setting of the chassis. After preparing a result protocol (step 54*d*), VCI 1 may be disconnected again from vehicle 10 (step 54*e*) upon completion of the repair shop visit. In a step 55, the repair shop order may then be completed, and the data and the result protocols of the repair shop visit may be stored in a central repair shop system, e.g., central repair shop server 45, for repeated use during a future repair shop visit of the customer or vehicle 10.

Figure 4A:
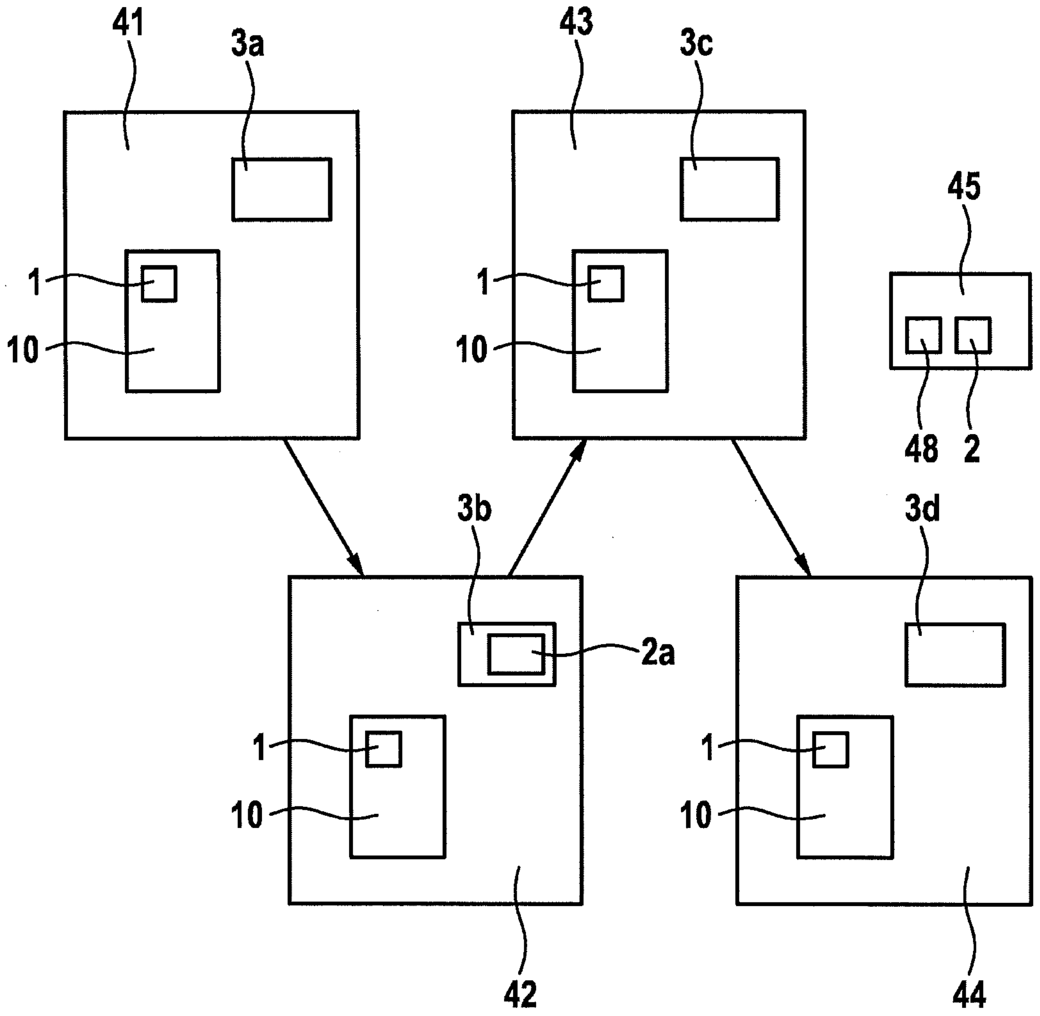
FIG. 4*a* shows a schematic representation of a method for identifying, diagnosing, maintaining, and repairing a vehicle in a repair shop via a VCI, a central repair shop server, and/or local diagnostic server devices according to another example embodiment of the present invention.

FIG. 4*a* shows a schematic representation of a flow of a method for identifying, diagnosing, maintaining, and repairing a vehicle in a repair shop via a VCI, a central repair shop server including a central diagnostic server device and/or local diagnostic server devices according to another example embodiment of the present invention.

The method according to FIG. 4*a* essentially differs from the method according to FIG. 4 only in that a group of specific vehicle inspection devices, here only vehicle inspection device 3*b*, for example, may be equipped with decentralized diagnostic server device 2*a*. In addition to the communication via central diagnostic server device 2 of central repair shop server 45, the vehicle inspection devices of the group of specific vehicle inspection devices may thus establish a direct communication with VCI 1. In this way, it is possible in the case of failure of central diagnostic server device 2 and/or repair shop server 45 that VCIs 1 may be continuously accessed via decentralized diagnostic server devices 2*a*, here via vehicle inspection device 3*b*, for example. Here, any number of vehicle inspection devices may be equipped with such a decentralized diagnostic server device 2*a*. It is furthermore possible to equip universal input and display units, in particular, with such a decentralized diagnostic server device 2*a*.

Many advantages result from using VCI 1 as well as the method according to the present invention for identifying, diagnosing, maintaining, and repairing a vehicle in a repair shop. The described example embodiments of the present invention provide for the identification of vehicle 10, necessary for the control unit communication, to be carried out only once per repair shop visit and to be expanded at individual work stations or by individual vehicle inspection devices only as needed. This results in a significant amount of time being saved during the repair shop visit. The vehicle identification data once detected are equally available at every work station, since they are moved along with vehicle 10 from work station to work station via VCI 1 and may be read out centrally via a repair shop server 45 including central diagnostic server device 2. The risk of operating errors or erroneous inputs during the identification of vehicles is also reduced, since, on the one hand, the already stored identification data may be retrieved from the VCI, and, on the other hand, every vehicle in the repair shop may be called up for processing via the central repair shop server in a controlled manner. Specific vehicle inspection devices and universal input and display units may alternatively be equipped with a standardized decentralized diagnostic server device, and there is no need for a complex adaptation process to the particularities of the individual vehicle inspection device.

According to an example embodiment, depending on the functional scope of the particular work station, the control software of the vehicle inspection device is able to perform a selective activation during its communication with the electronic control units of the vehicle by which selective activation only those functions which are in fact needed for the particular work station are activated. This enables a simple and advantageous handling of the particular specific vehicle inspection devices or universal input and display units at the specific work stations in the repair shop. The users of the vehicle inspection devices at the work stations will not need as many required qualifications when handling the control unit communication, since the communication between the electronic control units in the vehicle and the vehicle inspection devices may take place in the background and automatically to the greatest possible extent.

What is claimed is:

1. A method for diagnosing a vehicle in a repair shop, the method comprising:

connecting a first vehicle inspection device to a first work station;

establishing a communication connection between the first vehicle inspection device and a central repair shop server that includes a central diagnostic server device and a detection software component;

connecting a mobile communication device to the vehicle;

establishing a communication connection at the first work station with the first vehicle inspection device and the mobile communication device;

detecting identification data for the vehicle using the first vehicle inspection device and storing the identification data in the mobile communication device via the central diagnostic server device situated on the central repair shop server;

carrying out a first set of inspections of the vehicle using at least one of the first vehicle inspection device and the mobile communication device; subsequently disconnecting the first vehicle inspection device from the vehicle;

subsequently connecting a second vehicle inspection device to the vehicle and reading out the identification data from the mobile communication device into the second vehicle inspection device at a second work station via the central diagnostic server device; and carrying out a second set of inspections of the vehicle using at least one of the second vehicle inspection device and the mobile communication device connected to the vehicle.

2. The method of claim 1, further comprising:
connecting a universal input and output unit to the vehicle;
reading out the identification data from the mobile communication device via the central diagnostic server device in the universal input and output unit; and
carrying out additional inspections of the vehicle using the universal input and output unit and the mobile communication device connected to the vehicle at a third work station.

3. The method of claim 1, wherein at least one of the communication connection between the mobile communication device and the central diagnostic server device, the communication connection between the mobile communication device and the vehicle inspection devices, and the communication connection between the mobile communication device and the universal input and output unit is a wireless communication connection.

4. The method of claim 1, further comprising:
ascertaining in the central diagnostic server device identification data of vehicles present in the repair shop and provided with mobile communication devices;
transmitting the ascertained identification data to at least one of the first and second vehicle inspection device; and
displaying the ascertained identification data at at least one of the first work station and the second work station.

5. The method of claim 4, wherein the display of identification data takes place as a function of a proximity of the vehicles to the work stations.

6. The method of claim 1, further comprising:
establishing a direct communication connection between at least one of the first and second vehicle inspection devices and the mobile communication device.

7. A system for diagnosing a vehicle, the system comprising:
a central server including a diagnostic server device;
a plurality of mobile communication devices, each including:
a connecting device configured to connect the respective mobile communication device to a vehicle;
a memory device configured to store identification data of the vehicle; and
a first communication device configured to transfer identification data to the central diagnostic server device; and
a plurality of vehicle inspection devices, each including:
a second communication device for establishing a communication with the central server;
an input and output unit for controlling the vehicle inspection device and the mobile communication devices; and
a plurality of vehicle inspection modules configured to select an available one of the mobile communication devices via the central diagnostic server device and detection software for installation into a vehicle;
wherein:
the mobile communication devices are configured for identification data of the vehicle to be: detected and stored in the selected mobile communication device via the central diagnostic server device; and
retrieved from one of the plurality of mobile communication devices via the central diagnostic server device; and
the plurality of vehicle inspection devices are configured to carry out inspection-device specific vehicle inspections of the vehicle on the basis of the retrieved identification data.

8. The system of claim 7, wherein the central diagnostic server device is situated on a central repair shop server.

9. The system of claim 7, wherein the detection software is situated on at least one of on the central server and one of the vehicle inspection modules.

10. The system of claim 7, wherein each of at least one of the plurality of vehicle inspection devices includes a local diagnostic server device which is configured to establish a communication with the plurality of mobile communication devices.

11. The method of claim 1, further comprising:
connecting a universal input and output unit to the vehicle; reading out the identification data from the mobile communication device via the central diagnostic server device in the universal input and output unit; and
carrying out additional inspections of the vehicle using the universal input and output unit and the mobile communication device connected to the vehicle at a third work station;
wherein at least one of the communication connection between the mobile communication device and the central diagnostic server device, the communication connection between the mobile communication device and the vehicle inspection devices, and the communication connection between the mobile communication device and the universal input and output unit is a wireless communication connection.

12. The method of claim 11, further comprising:
ascertaining in the central diagnostic server device identification data of vehicles present in the repair shop and provided with mobile communication devices;
transmitting the ascertained identification data to at least one of the first and second vehicle inspection device; and
displaying the ascertained identification data at at least one of the first work station and the second work station.

13. The method of claim 12, wherein the display of identification data takes place as a function of a proximity of the vehicles to the work stations.

14. The method of claim 11, further comprising:
establishing a direct communication connection between at least one of the first and second vehicle inspection devices and the mobile communication device.

* * * * *